United States Patent [19]
Baron et al.

[11] Patent Number: 6,098,174
[45] Date of Patent: Aug. 1, 2000

[54] POWER CONTROL CIRCUITRY FOR USE IN A COMPUTER SYSTEM AND SYSTEMS USING THE SAME

[75] Inventors: Philip Baron, Greenville; Terry Strickland, Simpsonville; Jeffery Kaisner, Easley, all of S.C.

[73] Assignee: Cirrus Logic, Inc.

[21] Appl. No.: 09/128,299

[22] Filed: Aug. 3, 1998

[51] Int. Cl.[7] .................................. G06F 1/26; G06F 1/32
[52] U.S. Cl. .......................... 713/300; 713/310; 365/229
[58] Field of Search ..................................... 713/310, 300, 713/320, 321, 324; 365/226, 228, 229, 227; 379/258; 702/63

[56] References Cited

U.S. PATENT DOCUMENTS

| | | |
|---|---|---|
| 4,922,450 | 5/1990 | Rose et al. . |
| 5,742,514 | 4/1998 | Bonola . |
| 5,781,784 | 7/1998 | McKinley . |
| 5,815,455 | 9/1998 | Braitkwaite et al. . |
| 5,884,086 | 3/1999 | Amoni et al. . |
| 5,958,057 | 9/1999 | Gianni . |

*Primary Examiner*—Gopal C. Ray
*Attorney, Agent, or Firm*—James J. Murphy; Winstead Sechrest & Minick; Peter Rutkowski

[57] ABSTRACT

Circuitry 400 remotely controls the power in a computing system. An infrared receiver 401 receives a code transmitted from a remote device 206; Circuitry 402 generates a pulse in response to the code, the pulse emulating an output of a switch 205. A transistor 403 has a control terminal for receiving the pulse and outputting a control signal in response.

22 Claims, 3 Drawing Sheets

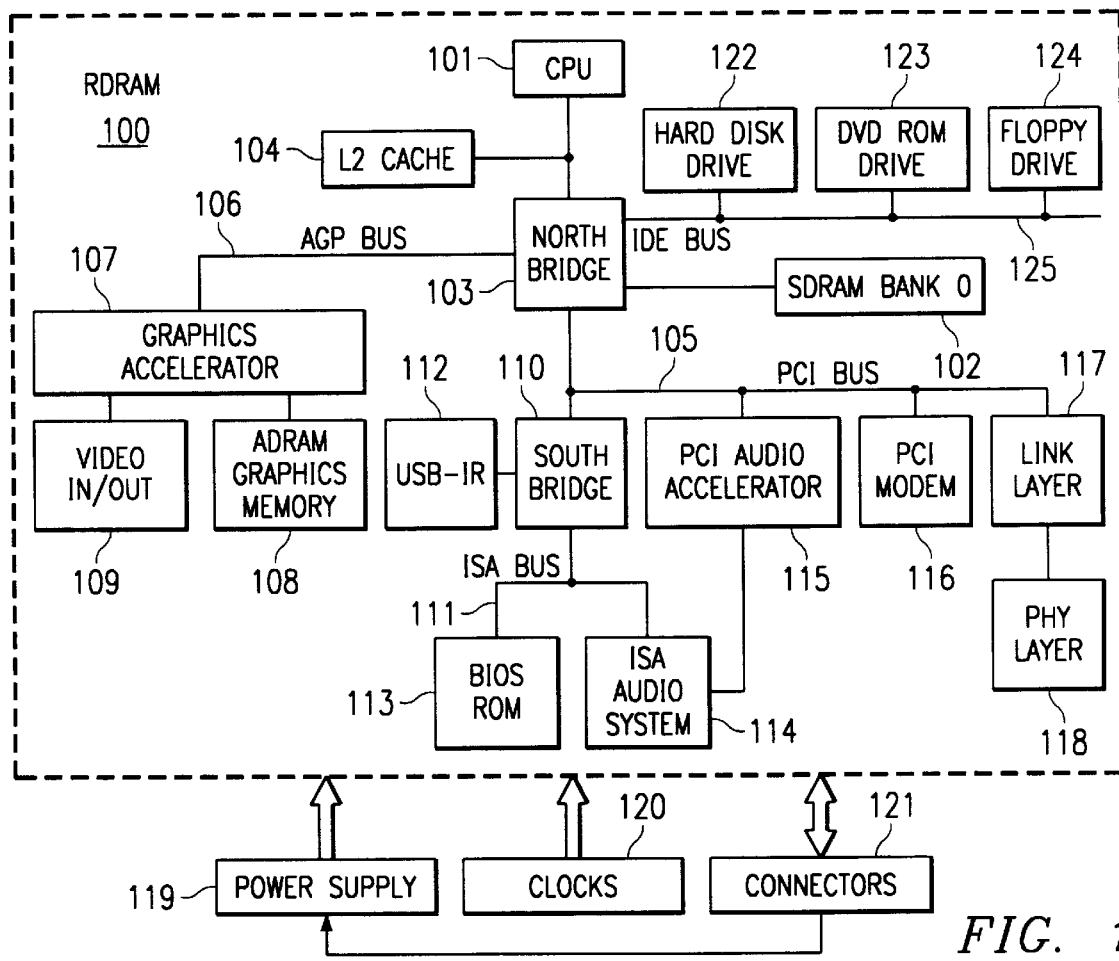
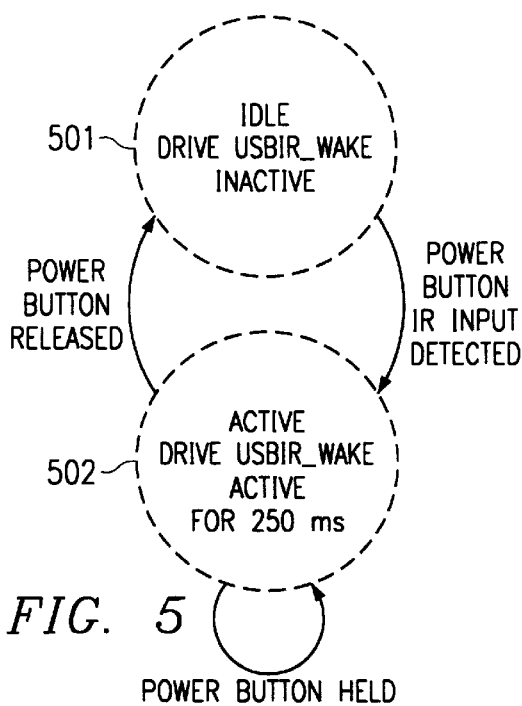
FIG. 5
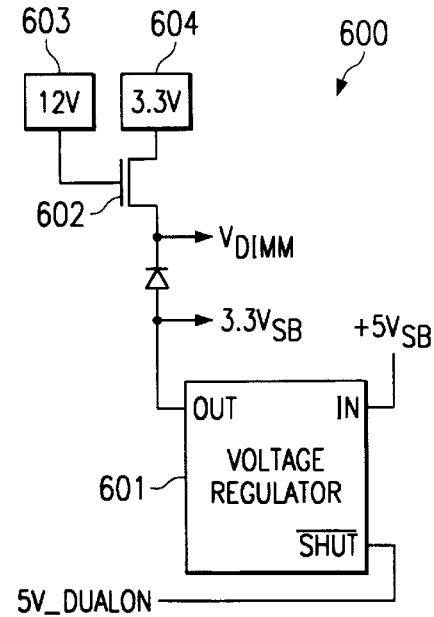
FIG. 6

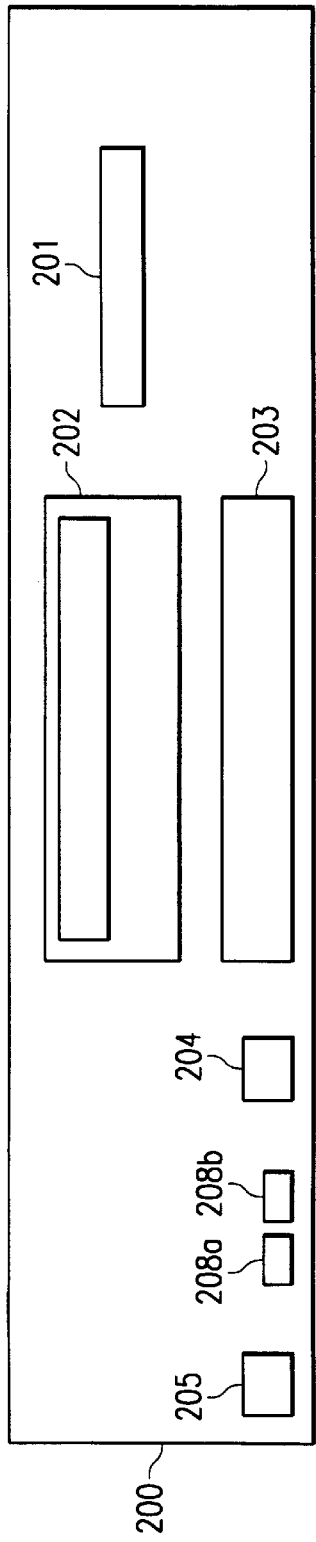
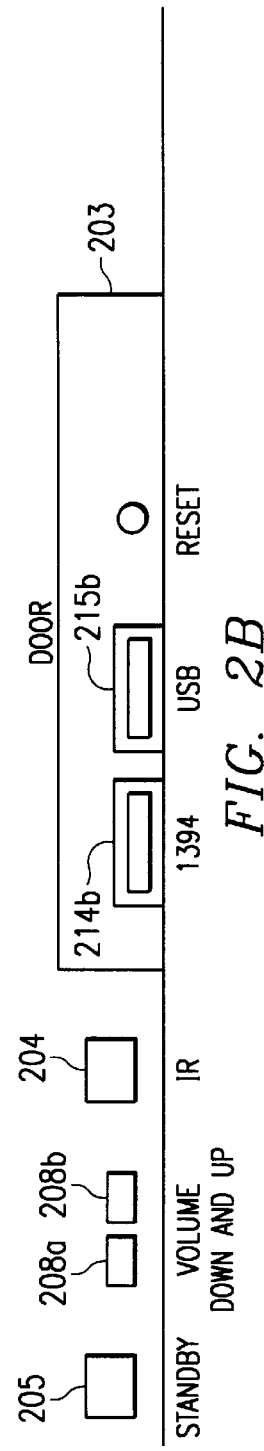
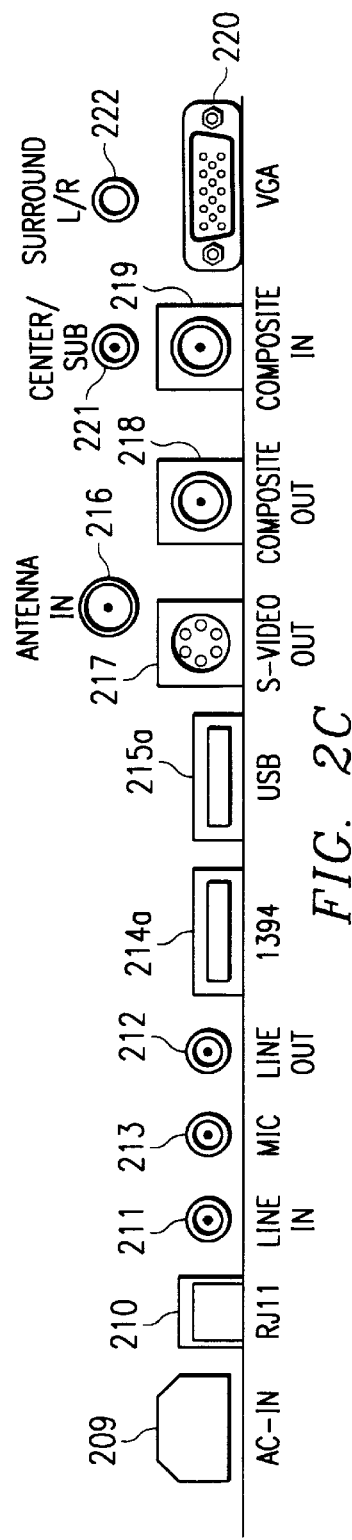

POWER CONTROL CIRCUITRY FOR USE IN A COMPUTER SYSTEM AND SYSTEMS USING THE SAME

BACKGROUND OF THE INVENTION

1. Field of the Invention

The present invention relates in general to computers and in particular to power control circuitry for use in a computer system and systems using the same.

2. Description of the Related Art

In the last few years, purchasers of electronic appliances such as personal computers (PCS) and digital home entertainment systems, have not only demanded the latest technology but also lower prices. In the case of home entertainment systems, the purchaser additionally may demand that a system, such as a digital video disk (DVD) player, have a "look and feel" similar to that of a stereo equipment or a VCR, despite the fact that the entertainment system may have much or more functionality as a PC. In other words, in a home entertainment system, it has become desirable that the system be compactly packaged instead of being packaged like a traditional PC with a series of components (computer, monitor, keyboard, mouse) coupled together by cables. To build such a low-cost, high-functionality, compactly packaged system requires a great deal of forethought and innovation.

Among the features required for consumer acceptance of a "full feature" personal computer/home entertainment system is a DVD player along with the video and audio processing components required to reproduce sharp images and clear sound. The ability to process video from other sources, such as a TV tuner and audio from an associated audio source, such as a CD player, will increase the attractiveness of such a device. Additionally, the traditional processing features of a personal computer must be retained, such as a hard drive, floppy disk drive, as well as the capability to run the latest operating systems and applications program. Further, conveniences such as a keyboard or controller linked to the system through a wireless port further increase the marketability of the product.

In view of increasing demands by the consumer, the need has arisen for a home entertainment/PC system to meet these demands.

SUMMARY OF THE INVENTION

One embodiment of the teachings of the present invention is circuitry for remotely controlling power in a computing system. In this embodiment, an infrared receiver receives a code transmitted from a remote device. In response to the code, circuitry generates a pulse which emulates the output of a switch. A transistor receives the pulse at a control terminal and outputs a control signal in response.

The teachings of the present invention have significant advantages. Among other things, they allow a user to turn-on and turn-off a computer using a wireless remote control. This is only one of the major features that can increase the marketablility of a computer product, and in particular, an entertainment computer system.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a diagram of an entertainment computer system;

FIG. 2A is a diagram of the front panel of a packaged unit embodying the system of FIG. 1;

FIG. 2B is a diagram of the front panel connectors of the packaged unit of FIG. 2A;

FIG. 2C is a diagram of the backpanel connectors of the packaged unit of FIG. 2A;

FIG. 5 is a diagram describing the power control state machine operation; and

FIG. 6 is a diagram of the circuit which control memory power during system suspension/low power operation.

DESCRIPTION OF THE PREFERRED EMBODIMENTS

Figure 3:
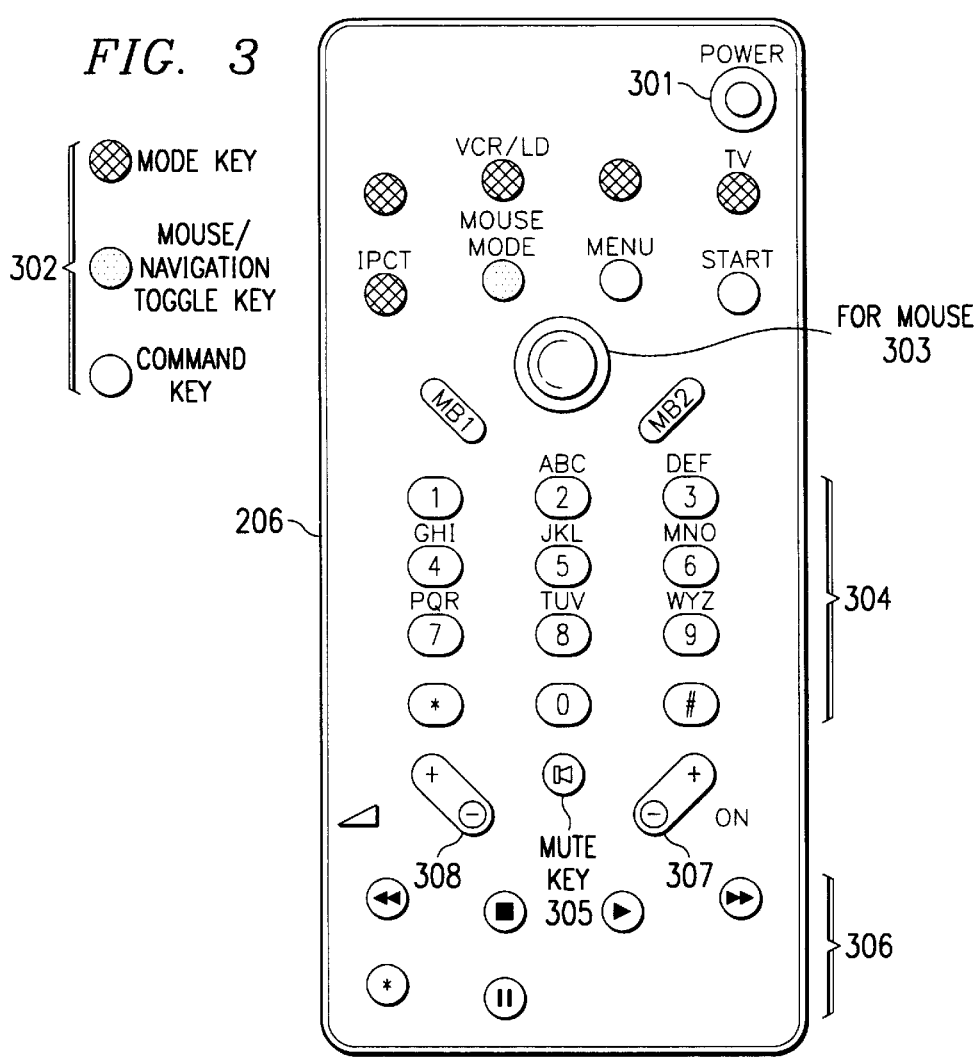
FIG. 3 is a diagram of a remote control unit suitable for use with the system of FIG. 1.

The principles of the present invention and their advantages are best understood by referring to the illustrated embodiment depicted in FIG. 1–6 of the drawings, in which like numbers designate like parts.

FIG. 1 is a diagram of an entertainment computer system 100 embodying the teachings of the present invention. System 100 advantageously integrates the functionality of a general purpose microprocessor based computer system with the high quality audio and visual capability of entertainment system on a single printed circuit (PC) board. As discussed further below, system 100 can be integrated with peripheral devices such as a digital video disk (DVD) player, a floppy drive, and a hard drive, in a single compact package. Among the functional features, system 100 incorporates a high speed modem for external communications, circuitry for processing 3D graphics data required for such software applications as gaming, circuitry for generating high quality video and audio from data received from a digital video disk (DVD) and/or compact disk (CD). Additionally, system 100 is able to generate audio and video for traditional television signals in the NTSC format.

System 100 is based on a central processing unit 101. The CPU runs the operating system software, provides overall system management, and generates graphics data. CPU 101 may be for example an Intel Pentium® MAX, Cyrix; M2, or AMD K6, or similar microprocessor operating with a clock speed of between 160 and 300 MHZ. In the present embodiment, the operating system is the Microsoft Windows 98 system which allows for universal serial bus (USB) expansion, supports DirectX 5.0 graphics processing software, the advanced configuration and power interface (ACP), and allows for DVD processing via the ActiveMovie 2.0 software and the Windows driver model (WDM).

System memory 102 supports CPU 101 through north bridge (core logic) 103. System memory 102 may be up to 128 Mbytes of SDRAM (synchronous dynamic random access memory). CPU 101 is additionally supported by an L2 cache 104 which may be for instance 256 or 512 kbytes of static random access memory (SRAM).

North bridge 103 interfaces CPU 101, system memory 102, and the devices on PCI bus 105 and 66Mhz AGP (accelerated graphics port) bus 106. With regards to the system memory, north bridge 103 acts as the system "host" managing buffers and registers in system memory required to support devices on the PCI and AGP buses. North bridge 103 also controls the memory operations required by the DRAMs of system memory 102, including physical address generation, read/write control, and cell refresh. North bridge 103 can also operate as the PCI bus master. In the illustrated embodiment, north bridge 104, is a SiS5592 chip set which includes integrated IDE Mode 3 and Mode 4 and Ultra-DMA/33 support, along with the PCI bus mastering capability. This device supports two separate data channels and four drives. North bridge 103, along with the south bridge discussed below, collectively form the system core logic chip set.

Graphics processing is based on graphics accelerator 107, operating off of AGP bus 106 (accelerator 107 is the master of AGP bus 106 in compliance with the AGP 1.0 specification), which in the illustrated embodiment is a Cirrus Logic CL-GD5465 high performance graphics accelerator which supports an Intel AGP hardware and Microsoft Direct3D graphics software. Graphics accelerator includes a 64-bit graphics engine with 3D games acceleration, and performs, among other things, a variety of texturing operations, the rendering of points, lines and triangles during display image generation and refresh, mono rasterization, blending, fog and transparency control, as well as video and MPEG2/DVD acceleration. In the illustrated embodiment, graphics accelerator also includes GUI (graphics user interface) accelerator which performs such tasks as hardware clipping, BitBlits (bit boundary block transfers) within graphics memory 108 and color expansion. An integrated VGA controller and an output to support a TV tuner are also preferably included.

Graphics memory 108 stores color-buffer, z-buffer, video, and texture data and acts as the traditional video/graphics frame buffer. In the illustrated embodiment, graphics memory 108 utilizes a Rambus® memory architecture running up to 600 Mbytes/second with 4 Mbytes of RDRAM.

Video data are exchanged with graphics controller 106 through video port 109. Video port 109 includes a decoder, such as an ITT VPX3225 multi-standard decoder, for decoding S-video, NTSC or PAL formatted video data into digital form for use by the graphics processor. Video port 109 also supports the input of NTSC or PAL video from a Cirrus Logic Legend I TV-tuner/DVD board which includes a Philips Fl1236 TV tuner module, a Sony CXA1724S TV audio decoder and an IBM CD1V MPEG2 decoder. Additionally, video port 109 includes a television encoder, such as a Cirrus Logic GD1053 NTSC/PAL encoder with flicker-filter preprocessor, which receives VGA and MPEG data from graphics processor 109 and outputs signals in compliance with either the NTSC or PAL (interlaced or noninterlaced) television formats for driving a television display. Additionally, the television encoder performs such tasks as flicker-filtering, insertion of closed captions, luminance and chrominance control, scaling, and window within window control.

South bridge 110 bridges PCI bus 105 and an ISA bus 111. South bridge 110 also provides the interface for receiving infrared (IR) signals through an IR window from a remote controller or keyboard and a universal serial bus (USB), collectively shown at block 112.

BIOS ROM 113 holds both the system BIOS along with an integrated video BIOS for graphics accelerator 107. In the illustrated embodiment, ROM 113 comprises 2 Mbits of flash memory with segmented ROM support on ISA bus 111. The system BIOS is preferably the Phoenix BIOS with ACPI and PnP.

Coupled to ISA bus 111 is an ISA audio system 114 which operates in conjunction with a PCI-based audio accelerator 115 coupled to PCI bus 105. Audio system 114 is preferably a Cirrus Logic CS4235 single chip ISA audio system. Digital audio data can be received from ISA bus 111 and processed using Microsoft Windows System or Sound Blaster/Sound Blaster Pro software. Data can also be received from a wavetable, such as a Cirrus Logic CS9236 wavetable synthesizer or a CD-ROM player. FM digital data can be synthesized on-chip. Data is exchanged directly with audio accelerator 115 through a dedicated interface.

Functionally, audio system 114 system can perform a number of tasks on the input digital audio data received from ISA bus 111. For example, the digital audio data can be converted into analog form and mixed with analog audio data input directly to the device. The analog data can come from such sources as a microphone, a monophonic audio source, or a stereo audio source, such as a CD player. The mixed data can then converted to digital audio and output to ISA bus 111 or audio accelerator 115. Mixed data can also be 3D enhanced and output as analog data.

Accelerator 115 is a DSP (digital signal processor) or similar processor based device, preferably a Cirrus Logic CS4610 PCI Audio Accelerator. Accelerator 115, along with its application and driver software, performs various audio processing functions simultaneously on multiple streams of data being exchanged with host based memory buffers in system memory 102 via PCI bus 105 and audio system 114. Generally, accelerator 115 provides acceleration for audio applications used in gaming, DVD and music playback, and video conferencing. Exemplary software audio applications which are supported by accelerator 115 are various versions of Microsoft DirectSound, DirectShow, and Aureal A3D Interactive. Some specific examples of the processing done by accelerator 114 are multichannel mixing and sample rate conversion, Dolby Digital and MPEG2 decoding, and wavetable synthesis and effects processing. In the illustrated embodiment, accelerator 115 includes a DMA controller with hardware scatter-gather for transferring data streams to and from the host memory buffers, advantageously minimizing host (north bridge 103) memory loading requirements. Additionally, in the illustrated embodiment, the accelerator-PCI bus interface can function as the PCI bus master.

Also operating of PCI bus 105 is a PCI-based modem 116, such as a Cirrus Logic CL-MD5622 Controllerless Modem, which supports both data and voice telephony, and FAX transmissions. In the controllerless embodiment, the host (north bridge 103) acts as the controller and modem 116 employs a DSP for such tasks as data modulation and demodulation, and interfacing with the telephone system and peripheral devices such as speakers and headsets. Modem 116, along with a microphone and a speaker or headset, supports full-duplex, echo-cancelled digital voice telephony. Data modulation can be performed in accordance with the 3 Com×2 software technology, ITU-V.34 software at 33.2 to 2.4 kbps in symmetric and asymmetric operation, along with ITU versions V.32 bis, V.23, V.22 bis, and V.21, and Bell 212A and 103 software. FAX modulation may be performed using ITU-T V.17 and V.19 software to 14.4 kbps. Modem 116 can receive data at up to 56 kbps.

Link layer 117 and physical layer 118, in combination, allow for an IEEE 1394 connection to be established with system 100. More particularly, link layer 117 interfaces with PCI bus 105 and physical layer 118 interfaces with at least one IEEE 1394 external port. Link layer 117 may be for example a Texas Instruments TSB12LV22 1394 Host Controller and physical layer 118 a Texas Instruments TSB41LV03 1394 Three Port Cable Transceiver/Arbiter.

Power supply 119 is a 90 watt power supply sourcing 3.3v, 5v, 12v and 5 vAux power in accordance with the SFX standard. Preferably, power supply 119 also conforms with the Intel PC98 Power Supply Specification. Lower voltages can also be jumper-selected from an on board power supply.

The system clocks are generated by clock circuitry 120. Clock circuitry 120 can be based for example on a Cypress CY2265 clock driver and a 14.31818 MHZ crystal oscillator. Additional dedicated crystals/crystal oscillators are used, as required, by some of the individual devices themselves.

Connector block 121 represents the external connectors, for connecting to case-external devices, and internal connectors for connecting system 100 with devices packaged with system 100 as a single unit. FIG. 2A is a diagram of the front panel of such a package or unit 200. Along with system 100, unit 200 includes a floppy disk drive 201, hard drive (internal, not shown), and DVD player 202, each connected to system 100 through internal connector or header. External connectors on the front panel reside behind an access panel (door) 203. An IR window allows communication with a remote device 207, such as a remote keyboard or a universal controller. The manual power switch for unit 200 is shown at 206 and volume controls at 208a and 208b.

FIG. 2B is a diagram of the front panel connectors behind access panel 203 and FIG. 2C a diagram of the backpanel connectors of unit 200. The function of each of the depicted connectors is as follows.

Analog audio can be input to and output from audio system 114 through three available standard stereo jacks on the unit 200 backpanel. Line-in jack 211 is a stereo input which provides analog audio, for instance from a compact disk player, to audio system 104 for mixing with digital data from the PCI bus or analog data received from another analog audio port. Similarly, signals from a microphone can be input to audio system 114 through MIC jack 213. The Line-out jack 203 is used to drive mixed analog data from audio system 114 to devices such as audio amplifiers, speakers and headphones.

Two IEEE 1394 compliant connectors 214a and 214b, one on the backpanel and one on the front panel, support communications in the IEEE 1394 protocol through physical layer 118 and link layer 117. Front- and backpanel USB connectors 215a and 215b allow for the input and output of serial data to and from system 100 through port 112 and south bridge 110.

Connections to video port 109 can made through an antenna connector 216, an S-video output port 217, NTSC composite input and output ports 218 and 219 (both RCA jacks) or VGA connector 220. Surround sound L/R and center/sub audio are output through standard stereo jacks 221 and 222. Specifically, antenna 216 and composite input 218 feed broadcast NTSC or PAL into a TV tuner card, such as found on the Cirrus Legend 1 card discussed above. Composite video output port couples data from the NTSC/PAL encoder to a television or similar NTSC/ PAL based display device. S-Video output connector (port) 217 drives S-Video data generated by the NTSC/PAL encoder to an S-Video compatible display device. VGA connector 220 is a standard connector for driving an RGB-data based display, such as a computer display, under control of the VGA controller within graphics accelerator 107.

AC connector 209 on the backpanel supports the connection of power supply 119 with an external source of AC power. RJ11 connector 210 supports a connection between unit 200 and a conventional female telephone jack. RJ11 supports the exchange of modulated voice, data and FAX with the modem 116 chip set through an DAA interface.

As indicated above, IR window 204 allows unit 200 to wirelessly communicate with a remote device 206 such as a universal controller or keyboard. In the illustrated embodiment, remote device 206 is a Philips RC8642 Remote Control Unit. A diagram of the front face of this unit is provided as FIG. 3. The following discussion will be based on this exemplary embodiment.

Remote 206 includes a power button 301 for turning-on and turning-off unit 200. Buttons 302 control various functions available to the user, such as TV, A/V amplifier-tuner, and the like. A button is also provided for selecting the mode of a mouse and mouse buttons 304. An alpha-numeric keypad is depicted generally at 304, a mute button at 305 and VCR/DVD controls generally at 306. Channel and volume controls are shown at 307 and 308 respectively.

When a button is pressed, a code representing the function associated with that button is transmitted as modulated IR signals under a defined protocol compatible with the receiving device. The code set is stored as firmware in ROM within remote 206.

Figure 4:
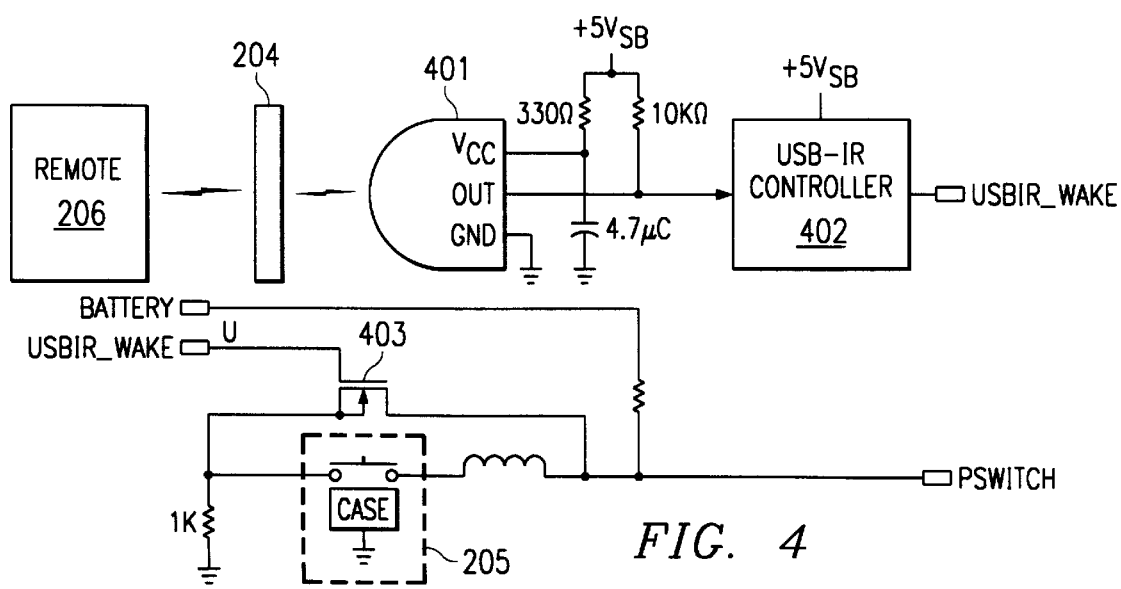
FIG. 4 is diagram of the IR communications subsystem of the system shown in FIG. 1.

FIG. 4 is more detailed block diagram of part of the remote 204 —system 100 IR communications subsystem within block 112 (pull-ups and signals not relevant to the present discussion have been omitted for clarity; see the electrical schematics in the Appendix hereto for further detail). In the illustrated embodiment, system power-down and power-up from remote 206 is implemented as follows, assuming that power-down is being performed (power-up works in a similar manner).

When the power button is pressed on remote 206, the corresponding power down code is transmitted to system 100 via IR window 204 and an IR receiver (detector) 401. Receiver 401 could be for example a Temic Semiconductor TSOP1136 Photo Module for 36 khz PCM. IR receiver 401 converts the received IR code signal into electrical form. The resulting electrical signal is transmitted to a dedicated input pin to USB-IR controller 402. This controller is preferably a Philips Semiconductor 83C654 microcontroller programmed to support the IR and USB functions of unit 200, including control of the power button operations. (The Phillips 83C654 controller is modified to include an additional pin for receiving signals for IR receiver 401). Note that receiver 401 and controller 402 operate from a +5V standby supply which remains powered-up (as long as AC power is available) even though the remaining power sources in system 100 have shut-down. Also recognize that power down and power-up does not necessarily have to be initiated by the power button on remote 206. For example, a set of keystrokes into the alphanumeric pad could be used for power control, depending on the firmware programming.

When controller 401 receives the active power code from receiver 401, it runs the state machine shown in FIG. 5 (the state machine function being programmed in the microcontroller on-chip ROM). The state machine is in the IDLE at state 501 waiting for the power-down signal from IR receiver 401. Assume for discussion that system 100 is on and operating during the time the state machine is idling. When the power-down signal is received from receiver 401, controller 402 generates a 250 millisecond pulse at state 502 and outputs the pulse as USBIR_WAKE on a dedicated output (if a Philips 83C654 is used, this output must also be added). When the remote power button is released, the state machine returns to IDLE state 501. If the user continues to hold the power button, the state machine loops at state 502 until the button is released.

The 250 ms pulse output from controller 402 (USBIR_WAKE) controls the current flow through field effect transistor 403. This current path parallels that controlled by unit

200 power switch 205. Significantly, the USBIR_WAKE pulse emulates the pulse output from power switch 205 when unit power switch 205 is depressed. The 250 millisecond pulse at the gate of transistor 403 in turn causes the generation of a 250 millisecond signal PSWITCHW, which is sent to south bridge 110 and system 100 is shut-down or sent into a low power state (suspend-to-RAM) in accordance with the Intel ACDI specification.

If system 100 has become inactive for an extended period, or if the system is configured to respond from a depression of power switch 205, or remote 206, system 100 enters a Suspend-to-RAM state wherein all system and application software and data are stored in the appropriate on-board RAM in the DRAMs of system memory 102. The "inactive" state occurs when inputs have not been received from the mouse, keyboard, or network typically connected to system 100. The lack of need for display update or the inactivity of modem 116 can also indicate inactivity. The length of the extended period of inactivity is selected by the user through the operating system graphical user interface. The user can also select which devices will cause the system to wake-up. For example, the user may select movement of the mouse, entry of keystrokes or a telephone ring to be the triggering event.

When the software timing monitoring inactivity times out indicating an inactive state, or the user makes the appropriate input, the APCI code in the operating system saves the appropriate application and operating system software, along with any data, in system memory 102. The operating system then writes to register in the CPU/PCI/USB/PWR MISC chip within south bridge chip set 110. In turn, south bridge 110 outputs a signal (MEM_CKE) to the DRAM DIMM (dual in-line memory module) of system memory 102. This signal causes the DIMM to enter a low power state in which the memory contents are retained but the DIMM interface to north bridge 103 is shut down.

After the software and data have been saved, the primary 12V, 5V and 3.3V power are turned-off by signal (#OCCTL) output by south bridge 110. The DRAMs of the system memory 102 are now powered by a small single 5V on-board standby power supply (outputting approximately 200 mA). Additionally, IR receiver 401 and USB-IR controller 402 remain powered by the 5V stand-by power source in order to detect and respond to incoming codes from remote 206.

FIG. 6 is a diagram of circuit 600 which controls the power during the Suspend-to-RAM state. Circuit 600 is based on a voltage regulator 601, preferably a Linear Technology LT1121CS8 Adjustable Voltage Regulator. When system power is up, the primary 12V supply 603 maintains transistor 602 in the on-state. In this case, the voltage to the DIMM module, VDINM of system memory 102 is supplied from the primary 3.3V supply 604. When these supplies power down in response to south bridge 110, south bridge 110 forces signal 5V-DUALON low which causes regulator 602 to output a 3.3 $V_{SB}$ standby voltage which supplies the system memory 100 DIMM from the small +5Vsb standby power supply.

System 100 wakes-up when either a command is received from remote 206 (e.g. power button depression) or when a triggering event, such as mouse movement or a modem ring, occurs. In the case where a command is received from remote 206, a 250 mS pulse is generated as described above and the signal USBIR_WAKE signal is used to signal system wake-up.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed:

1. Circuitry for remotely controlling power in a computing system by selectively turning-on and turning-off at least one power source within said system comprising:

an infrared receiver for receiving a code transmitted from a remote device;

circuitry for generating a pulse in response to said code, said pulse emulating an output of a switch;

a transistor having a control terminal for receiving said pulse and outputting a control signal in response; and control logic operable to turn-off and turn-on said power source in response to said control signal.

2. The circuitry of claim 1 wherein said pulse emulates the output of a mechanically actuated switch.

3. The circuitry of claim 1 wherein said transistor comprises a field effect transistor having a gate for receiving said pulse and a current path for selectively driving said control signal from a voltage source in response.

4. The circuitry of claim 1 wherein a width of said control signal approximate a width of said pulse.

5. The circuitry of claim 1 wherein said pulse has a width of about 250 milliseconds.

6. A power control system for use in a computer having at least one power source comprising:

control logic for turning-on and turning-off said power source in response to a control pulse;

a mechanical switch operable to output a power control pulse in response to user input; and remotely activated power control circuitry coupled electrically in parallel with said mechanical switch comprising:

a receiver for receiving a code transmitted from a remote device;

a controller for decoding said code and generating a first signal emulating said pulse output from said mechanical switch; and an electrical switch for receiving said first signal from said controller and driving a second signal from a voltage source in response, said second signal transmitted to said control logic for selectively turning-on and turning-off said power source.

7. The system of claim 6 wherein said mechanical switch comprises a push button switch.

8. The system of claim 6 wherein said pulse output from said mechanical switch has a width and said first signal output from said controller approximates said width of said pulse.

9. The system of claim 6 wherein said electronic switch comprises a transistor.

10. The system of claim 6 and wherein said remote device is operable to wirelessly communicate with said receiver.

11. The system of claim 10 wherein said remote device comprises a universal controller.

12. The system of claim 10 wherein said remote device comprises a keyboard.

13. Memory power supply circuitry comprising:
 a first primary voltage supply for supplying a first voltage to a memory during a first state;
 a transistor having a current path for coupling said first voltage to said memory in response to a second voltage applied to a control terminal of said transistor;
 a second primary voltage supply for supplying said second voltage to said control terminal during said first state;
 circuitry for powering down said first and second power supplies during a second state;
 a standby voltage supply for supplying a standby voltage during said second state; and
 a voltage regulator for generating a memory standby voltage from said standby voltage for operating said memory in said second state.

14. The power supply circuitry of claim 13 wherein said voltage regulator selectively provides said standby memory voltage to said memory in response to a signal applied to a control input of said voltage regulator.

15. The power supply circuitry of claim 13 wherein said first primary supply voltage does not equal said second primary supply voltage.

16. The power supply circuitry of claim 15 wherein said first primary power supply supplies a voltage of approximately +3.3V and said second primary supply voltage supplies of voltage of approximately +12V.

17. The power supply circuitry of claim 13 wherein said standby power supply consumes substantially less power than said first and second primary voltage supplies.

18. A computer system comprising:
 a central processing unit running an operating system;
 first core logic for interfacing said central processing unit with a system memory and a bus;
 a peripheral controller coupled to said bus;
 second core logic coupled to said bus, said second core logic in response to a power down signal operable to:
  save a state of the operating system and data being processed in system memory;
  switch said system memory to a low power mode;
  terminate primary power to said central processing unit, said controller and said system memory; and
  switch standby power to said system memory.

19. The system of claim 18 and further comprising circuitry for supplying said primary and memory standby power comprising:
 a first primary voltage supply for supplying a first voltage to said system;
 a transistor having a current path for coupling said first voltage to said memory in response to a second voltage applied to a control terminal of said transistor;
 a second primary voltage supply for supplying said second voltage to said control terminal of said transistor during said first state;
 circuitry under control of said second core logic for powering down said first and second power supplies to terminate power to said processor, said controller and said memory;
 a standby voltage supply for supplying a standby voltage to said system and having substantially less current drive than said first and second primary power supplies; and
 a voltage regulator for generating a memory standby voltage from said standby voltage for operating said memory after powering-down said first and second voltage suppliers.

20. The memory of claim 18 and further comprising circuitry for initiating power down of said system comprising:
 a manually activated switch operable to output a power control pulse of a predetermined width in response to user input; and
 remotely activated power control circuitry coupled electrically in parallel with said manually activated switch comprising:
  a receiver for receiving a code transmitted wirelessly from a remote device;
  a controller for decoding said code and generating a first signal emulating said pulse output from said mechanical switch; and
  an electrical switch for receiving said first signal from said controller and sending a second signal to said second core logic in response.

21. The memory of claim 20 wherein said bus comprises a PCI bus and said controller comprises an audio data accelerator.

22. The memory of claim 21 wherein said bus comprises an AGP bus and said controller comprises a graphics accelerator.

* * * * *